(12) United States Patent
Ki et al.

(10) Patent No.: US 12,699,652 B2
(45) Date of Patent: Aug. 4, 2026

(54) SYSTEMS AND METHODS FOR MANAGEMENT OF VIRTUALIZED MEMORY

(71) Applicant: Samsung Electronics Co., Ltd., Suwon-si (KR)

(72) Inventors: Yang Seok Ki, Palo Alto, CA (US); Myung June Jung, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 19/038,699

(22) Filed: Jan. 27, 2025

(65) Prior Publication Data

US 2026/0086945 A1     Mar. 26, 2026

Related U.S. Application Data

(60) Provisional application No. 63/699,797, filed on Sep. 26, 2024.

(51) Int. Cl.
*G06F 12/0862*          (2016.01)

(52) U.S. Cl.
CPC .. *G06F 12/0862* (2013.01); *G06F 2212/6024* (2013.01)

(58) Field of Classification Search
None
See application file for complete search history.

(56) References Cited

U.S. PATENT DOCUMENTS

| | | | |
|---|---|---|---|
| 10,365,681 | B1 | 7/2019 | Stark |
| 11,416,295 | B2 | 8/2022 | Bernat et al. |
| 11,740,906 | B2 | 8/2023 | Goudarzi et al. |
| 2008/0285571 | A1 | 11/2008 | Arulambalam et al. |
| 2018/0239705 | A1* | 8/2018 | Heirman ............. G06F 9/30047 |
| 2019/0004995 | A1 | 1/2019 | Sankaralingam et al. |
| 2019/0082005 | A1 | 3/2019 | Ghare et al. |

(Continued)

FOREIGN PATENT DOCUMENTS

| | | |
|---|---|---|
| CN | 103067425 | 4/2016 |

OTHER PUBLICATIONS

European Extended Search Report for Application No. 25201346.1, mailed Feb. 12, 2026.

(Continued)

*Primary Examiner* — Kaushikkumar M Patel
(74) *Attorney, Agent, or Firm* — Renaissance IP Law Group LLP

(57)          ABSTRACT

Provided are systems, methods, and apparatuses for systems and methods of scheduled prefetch mechanisms for memory pools. In one or more examples, the systems, devices, and methods include adding a memory request to a list of requests based on a determination that a prefetch option in the memory request is enabled; determining that performing the memory request satisfies a timing condition and a transaction condition indicated in the memory request; placing, in a position of a command queue, a command that is generated based on the determination that performing the memory request satisfies the timing condition and the transaction condition; and sending a notification to a source of the memory request based on a determination that the command is executed.

20 Claims, 9 Drawing Sheets

(56)  References Cited

U.S. PATENT DOCUMENTS

| | | |
|---|---|---|
| 2020/0334168 A1 | 10/2020 | Rankin |
| 2021/0034415 A1* | 2/2021 | Iizawa .................. G06F 9/3009 |
| 2021/0377150 A1 | 12/2021 | Dugast et al. |
| 2022/0116487 A1 | 4/2022 | Sundar et al. |
| 2022/0224624 A1 | 7/2022 | Kasichainula |
| 2022/0337518 A1 | 10/2022 | Butler et al. |
| 2023/0057492 A1 | 2/2023 | Kothandaraman et al. |
| 2023/0057633 A1 | 2/2023 | Nguyen et al. |
| 2023/0138094 A1 | 5/2023 | Guim Bernat et al. |
| 2023/0244461 A1 | 8/2023 | Shah et al. |
| 2023/0267081 A1 | 8/2023 | Joseph et al. |
| 2023/0359550 A1* | 11/2023 | Muthiah ............. G06F 12/0246 |
| 2023/0409198 A1 | 12/2023 | Zhou et al. |
| 2024/0078185 A1 | 3/2024 | Agostini |
| 2024/0281150 A1* | 8/2024 | Zeng .................... G06F 3/0679 |
| 2024/0289049 A1* | 8/2024 | Hosaka ............... G06F 12/0888 |
| 2025/0110863 A1* | 4/2025 | Abhishek Raja ... G06F 12/0864 |

OTHER PUBLICATIONS

Nardelli, Matteo et al., "Efficient Operator Placement for Distributed Data Stream Processing Applications," IEEE Transactions on Parallel and Distributed Systems, vol. 30, No. 8, Aug. 2019, pp. 1753-1767.
European Office Action for Application No. 25201346.1, mailed Jun. 5, 2026.

* cited by examiner

Memory Module 405

Local Manager 415

DMR Resource Manager 455

DMR Training Agent 460

Caching Agent 465

Local Memory 410

VPAG 420

Prefetch Manager 475

Packet Dispatcher 485

Local Memory Controller 470

RMTC 480

Stream Processor 430

Coherence Manager 425

Address Map Table 435

OOB Channel 450

CXL Port 445

CXL Port 440

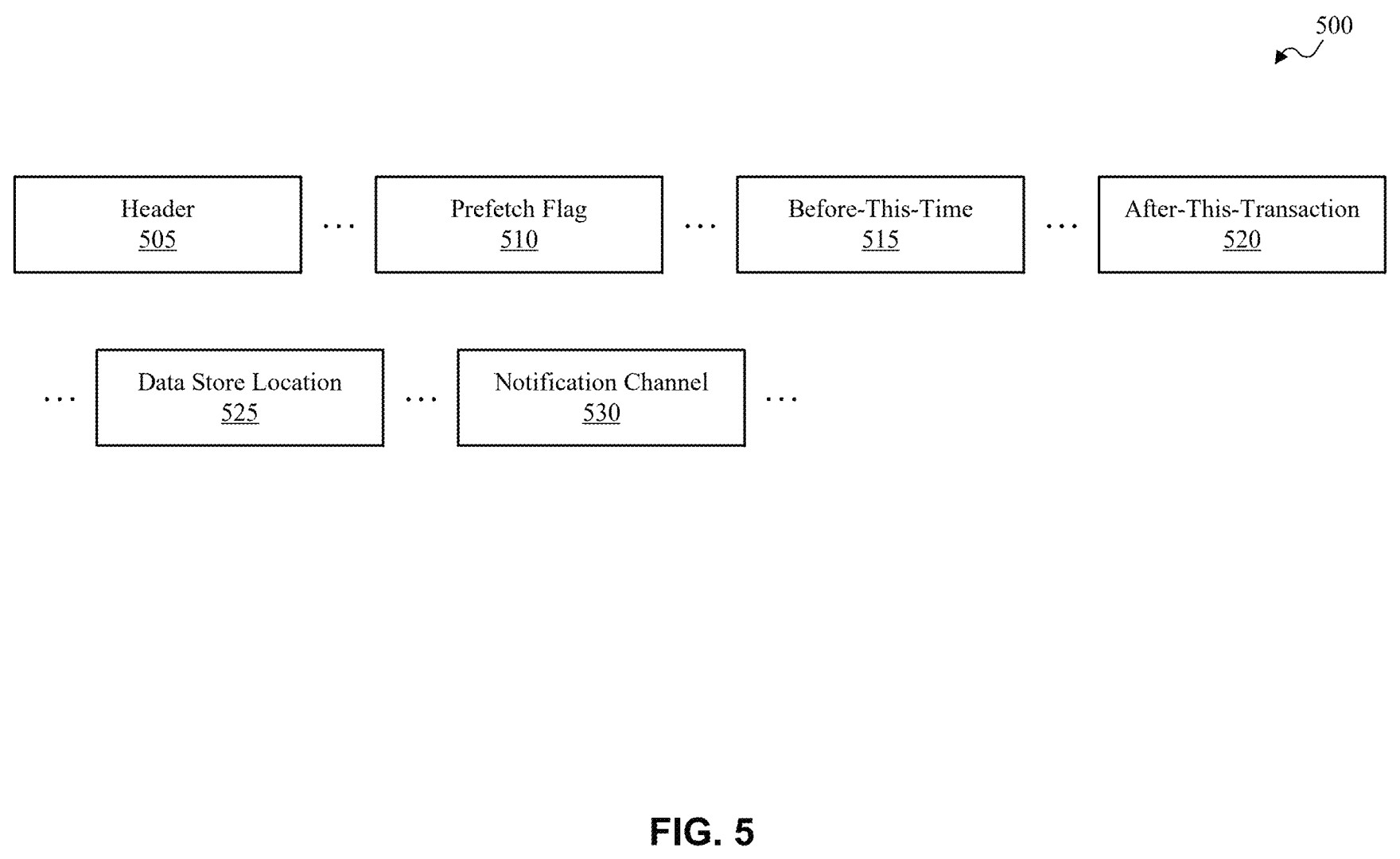

500

Header
505

Prefetch Flag
510

Before-This-Time
515

After-This-Transaction
520

Data Store Location
525

Notification Channel
530

FIG. 5

Add a memory request to a list of requests
805

Determine that performing the memory request satisfies a timing condition and a transaction condition
810

Place a command in a slot of a command queue
815

Send a notification to a source of the memory request
820

Add a memory request to a list of requests
905

Determine that performing the memory request satisfies a timing condition and a transaction condition
910

Determine that the memory request is from a remote device
915

Place a command in a slot of a command queue
920

Send a notification to a source of the memory request
925

SYSTEMS AND METHODS FOR MANAGEMENT OF VIRTUALIZED MEMORY

CROSS-REFERENCE TO RELATED APPLICATIONS

This application claims the benefit of U.S. Provisional Patent Application Ser. No. 63/699,797, filed on Sep. 26, 2024, which is incorporated by reference herein for all purposes.

TECHNICAL FIELD

The subject matter disclosed here relates to memory systems. In particular, the subject matter relates to systems and methods of scheduled prefetch mechanisms for virtual pools of memory.

BACKGROUND

The present background section is intended to provide context only, and the disclosure of any concept in this section does not constitute an admission that said concept is prior art.

Virtual memory is a memory management technique that allows a computer to use storage space to extend the amount of available memory (e.g., random access memory (RAM). Virtual memory can appear to be a larger memory space, allowing programs to run as if they have more memory than is physically available. Virtual memory may move less frequently accessed data from RAM to a swap file on the storage drive when RAM is full, which may be referred to as paging or swapping.

SUMMARY

In various embodiments, the systems and methods described herein include systems, methods, and apparatuses for scheduled prefetch mechanisms for virtual pools of memory. In some aspects, the techniques described herein relate to a method of managing a memory pool, the method including: adding a memory request to a list of requests based on a determination that a prefetch option in the memory request is enabled; determining that performing the memory request satisfies a timing condition and a transaction condition indicated in the memory request; placing, in a position of a command queue, a command that is generated based on the determination that performing the memory request satisfies the timing condition and the transaction condition; and sending a notification to a source of the memory request based on a determination that the command is executed.

In some aspects, the techniques described herein relate to a method, wherein the position is selected to schedule execution of the command based on the determination that performing the memory request satisfies the timing condition and the transaction condition indicated in the memory request.

In some aspects, the techniques described herein relate to a method, wherein satisfying the timing condition is based on a determination that the memory request is performed before a time indicated in the memory request.

In some aspects, the techniques described herein relate to a method, wherein satisfying the transaction condition is based on a determination that the memory request is performed after execution of a transaction indicated in the memory request.

In some aspects, the techniques described herein relate to a method, wherein a location of the position is selected based on a position of a second position of the command queue that holds the transaction indicated in the memory request.

In some aspects, the techniques described herein relate to a method, wherein a prefetch manager generates the command and adds the command to the command queue based on sending a message to the prefetch manager indicating that the timing condition and the transaction condition are satisfied.

In some aspects, the techniques described herein relate to a method, wherein the command is added to the command queue based on a determination that the source is remote from a host that is processing the memory request.

In some aspects, the techniques described herein relate to a method, wherein: the memory pool includes a memory space provided by a first memory module of the host and at least a second memory module of a second host, and the second host is connected to the host via a switch configured to operate with a cache coherent protocol.

In some aspects, the techniques described herein relate to a method, wherein the list of requests is configured to store memory requests from remote devices that have the prefetch option enabled.

In some aspects, the techniques described herein relate to a device for managing a memory pool, the device including: one or more processors; and memory storing instructions that, when executed by the one or more processors, cause the device to: add a memory request to a list of requests based on a determination that a prefetch option in the memory request is enabled; determine that performing the memory request satisfies a timing condition and a transaction condition indicated in the memory request; place, in a position of a command queue, a command that is generated based on the determination that performing the memory request satisfies the timing condition and the transaction condition; and send a notification to a source of the memory request based on a determination that the command is executed.

In some aspects, the techniques described herein relate to a device, wherein the position is selected to schedule execution of the command based on the determination that performing the memory request satisfies the timing condition and the transaction condition indicated in the memory request.

In some aspects, the techniques described herein relate to a device, wherein satisfying the timing condition is based on a determination that the memory request is performed before a time indicated in the memory request.

In some aspects, the techniques described herein relate to a device, wherein satisfying the transaction condition is based on a determination that the memory request is performed after execution of a transaction indicated in the memory request.

In some aspects, the techniques described herein relate to a device, wherein a location of the position is selected based on a position of a second position of the command queue that holds the transaction indicated in the memory request.

In some aspects, the techniques described herein relate to a device, wherein a prefetch manager generates the command and adds the command to the command queue based on sending a message to the prefetch manager indicating that the timing condition and the transaction condition are satisfied.

In some aspects, the techniques described herein relate to a device, wherein the command is added to the command queue based on a determination that the source is remote from a host that is processing the memory request.

In some aspects, the techniques described herein relate to a device, wherein: the memory pool includes a memory space provided by a first memory module of the host and at least a second memory module of a second host, and the second host is connected to the host via a switch configured to operate with a cache coherent protocol.

In some aspects, the techniques described herein relate to a non-transitory computer-readable medium storing code that includes instructions executable by a processor to: add a memory request to a list of requests based on a determination that a prefetch option in the memory request is enabled; determine that performing the memory request satisfies a timing condition and a transaction condition indicated in the memory request; place, in a position of a command queue, a command that is generated based on the determination that performing the memory request satisfies the timing condition and the transaction condition; and send a notification to a source of the memory request based on a determination that the command is executed.

In some aspects, the techniques described herein relate to a non-transitory computer-readable medium, wherein the position is selected to schedule execution of the command based on the determination that performing the memory request satisfies the timing condition and the transaction condition indicated in the memory request.

In some aspects, the techniques described herein relate to a non-transitory computer-readable medium, wherein satisfying the timing condition is based on a determination that the memory request is performed before a time indicated in the memory request.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods of scheduled prefetch mechanisms for virtual pools of memory described herein include multiple advantages and benefits. For example, the Virtual Pool of Memory (VPoM) systems and methods described herein provide a shared memory system virtually configured with a set of donated memory regions from a group of individual CXL Memory Modules (CMMs). The VPOM systems and methods provide more consistent memory bandwidth and lower latency (e.g., compared to the centralized and physical CXL memory pool) based on the features of the VPOM architecture described herein. The systems and methods provide coherence management schemes and VPoM performance enhancement features (e.g., prefetch processing, stream processing) that improve system performance.

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings, wherein:

FIG. 5 illustrates an example packet in accordance with one or more implementations as described herein.

Figure 1:
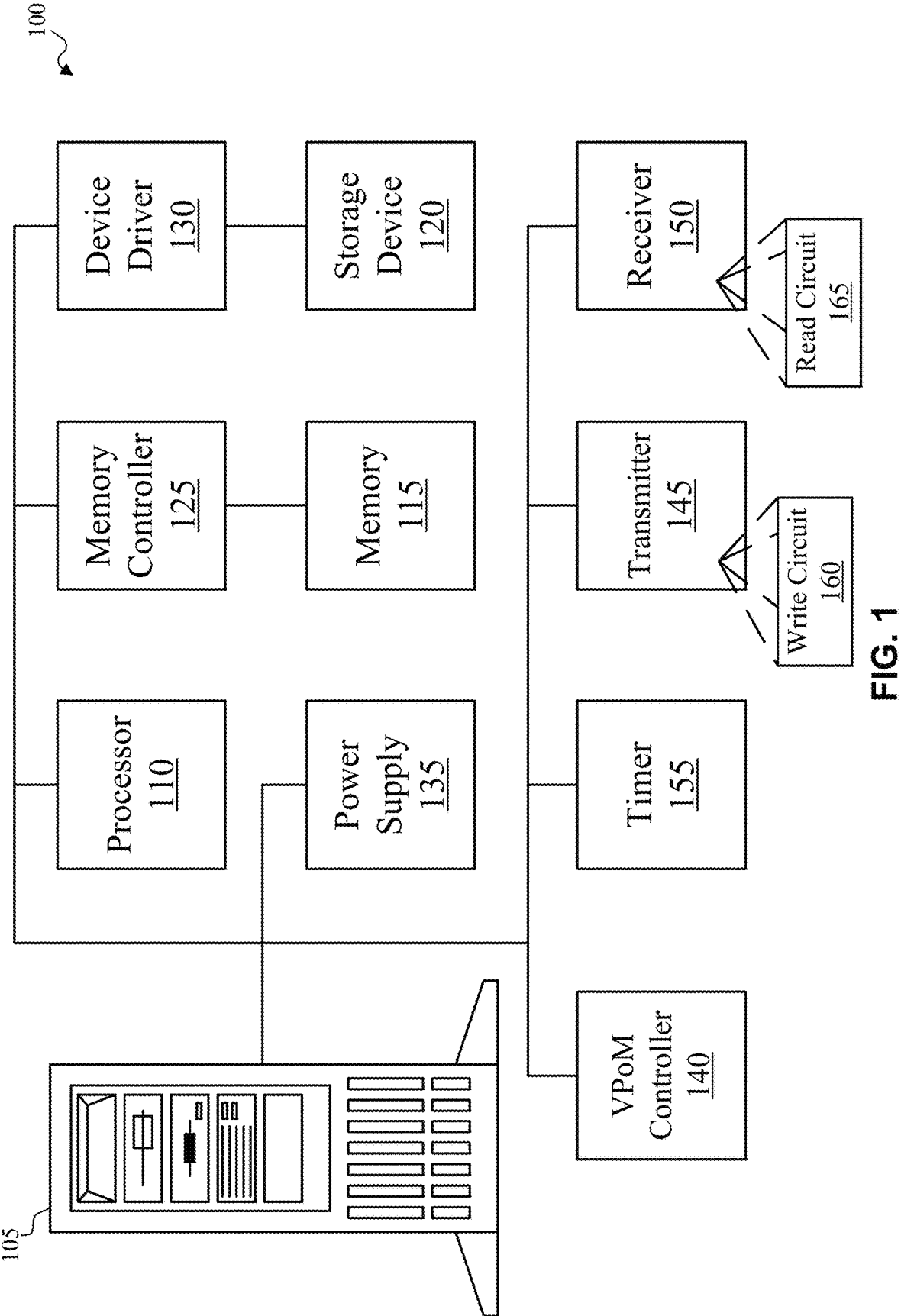
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/ or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random-access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/ or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Data processing may include data buffering, aligning incoming data from multiple communication lanes, forward error correction (FEC), etc. For example, data may be received by an analog front end (AFE), which can prepare the incoming data for digital processing. The digital portion of the transceivers (e.g., digital signal processor (DSP)) may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, SoC, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

Some computer systems may experience latency based on remote memory read performance. In the case of large language models (LLMs), managing remote memory read latency is crucial because remote memory read latency can directly affect the compute resource utilization and the service quality of inference models. Accordingly, a need exists for minimizing the latency penalty of remote memory read in memory systems.

The systems and methods described herein provide scheduled prefetch mechanisms based on virtual pool of memory (VPoM) systems. The systems and methods enable prefetch mechanisms (e.g., prefetch with LLMs) based on some processing sequences (e.g., processing sequences of LLMs) being well defined and anticipatable. The systems and methods can serve to minimize or avoid latencies associated with remote memory reads in VPOM systems. The system and methods may include monitoring and triggering a prefetch action based on an indicator, such as a Before-This-Time indicator and/or on an After-This-Transaction indicator. In some aspects, the systems and methods may be based on data structures for prefetch operations associated with virtual pools of memory. The systems and methods may provide scheduled prefetch mechanisms for virtual pools of memory based on a prefetch device architecture that includes a remote data prefetch manager and/or a memory transaction controller.

FIG. 1 illustrates an example system 100 in accordance with one or more implementations as described herein. In FIG. 1, machine 105, which may be termed a host, a system, or a server, is shown. System 100 may be configured for prefetch mechanisms (e.g., prefetch with LLMs) based on processing sequences (e.g., LLM processing sequences) being well defined and anticipatable. In some examples, system 100 may monitor and/or trigger a prefetch action based on an indicator, such as a Before-This-Time indicator and/or on an After-This-Transaction indicator. In some cases, system 100 may provide scheduled prefetch mechanisms for virtual pools of memory based on a prefetch device architecture. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for case of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe) interface, or a Compute Express Link (CXL) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115. Machine 105 may include power supply 135. Power supply 135 may provide power to machine 105 and its components.

Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. Transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120. In the illustrated example, machine 105 may include timer 155, which may be used to time one or more operations (e.g., VPOM operations), indicate a time period, indicate a lapse of time, indicate an expiration, indicate a timeout, etc. In some cases, timer 155 may be used to indicate a prefetch before-this-time condition is met.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), intelligent processing units (IPUs), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (Open-CAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, Infini-Band, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, virtual pool of memory (VPoM) controller 140 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of VPOM controller 140 may be implemented as an SoC.

In some examples, VPOM controller 140 may include any one or combination of logic (e.g., logical circuit), hardware (e.g., processing unit, memory, storage), software, firmware, and the like. In some cases, VPoM controller 140 may perform one or more functions in conjunction with processor 110. In some cases, at least a portion of VPOM controller 140 may be implemented in or by processor 110 and/or memory 115. The one or more logic circuits of VPOM controller 140 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable VPoM controller 140 to provide systems and methods of scheduled prefetch mechanisms for virtual pools of memory.

In one or more examples, VPoM controller 140 may provide scheduled prefetch mechanisms based on VPOM systems and architectures. VPoM controller 140 may minimize the latency penalty of remote memory read in VPOM systems. Machine 105 and/or VPoM controller 140 may incorporate and/or be implemented in a VPOM scheduled prefetch system architecture. VPoM controller 140 may include a VPOM Remote Data Prefetch Manager that supports prefetch triggering by prefetch-before-this-time and prefetch-after-this-transaction conditions, VPOM controller 140 may include a Remote Memory Transaction Controller configured with a dedicated prefetch queue in addition to the normal command queue, to provide performance isolation between prefetch and non-prefetch requests. VPoM controller 140 may provide prefetch processing flows and VPOM prefetch related data structures to enable scheduled prefetch mechanisms for virtual pools of memory. Based on the systems and methods described herein, VPoM controller 140 may minimize the latency penalty of remote memory read in VPOM systems. VPoM controller 140 may monitor and trigger prefetch action based on a Before-This-Time condition and/or an After-This-Transaction condition.

Figure 2:
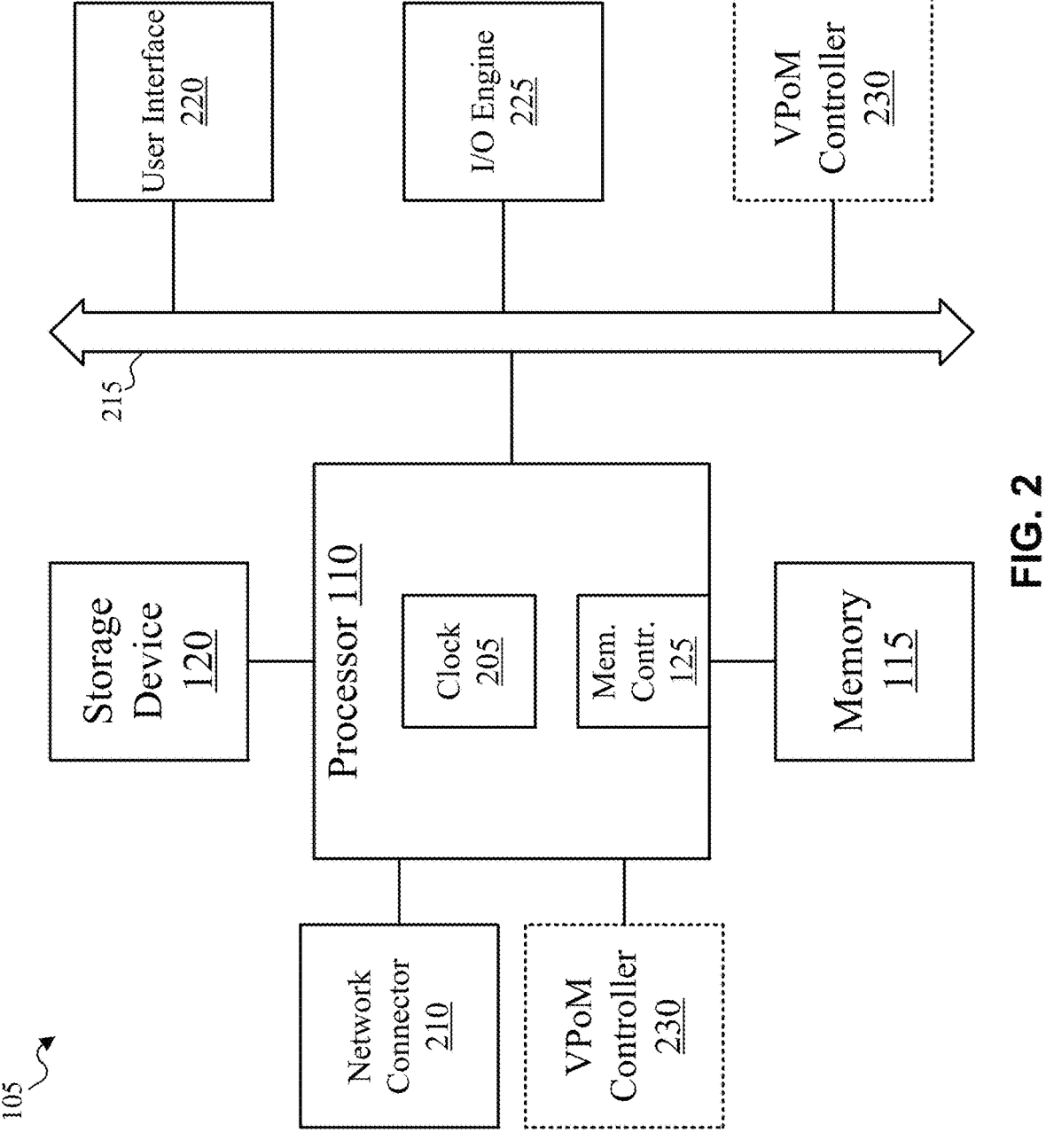
FIG. 2 illustrates details of the system of FIG. 1, according to one or more implementations as described herein.

FIG. 2 illustrates details of machine 105 of FIG. 1, according to examples described herein. In the illustrated example, machine 105 may include processor 110. Processor 110 may include one or more processors and/or one or more dies. Processor 110 may include memory controller 125 (e.g., one or more memory controllers) and clock 205 (e.g. one or more clocks), which may be used to coordinate the operations of the components of the machine. Processor 110 may be coupled to memory 115 (e.g., one or more memory chips, stacked memory, etc.), which may include random access memory (RAM), read-only memory (ROM), or other state preserving media, as examples. Processor 110 may be coupled to storage device 120 (e.g., one or more storage devices), and to network connector 210, which may be, for example, an Ethernet connector or a wireless connector. Processor 110 may be connected to bus 215 (e.g., one or more buses), to which may be attached user interface 220 (e.g., one or more user interfaces) and Input/Output (I/O) interface ports that may be managed using I/O engine 225 (e.g., one or more I/O engines), among other components. As shown, processor 110 may be coupled to VPoM controller 230, which may be an example of VPoM controller 140 of FIG. 1. Additionally, or alternatively, processor 110 may be connected to bus 215, to which may be attached VPOM controller 230.

Figure 3:
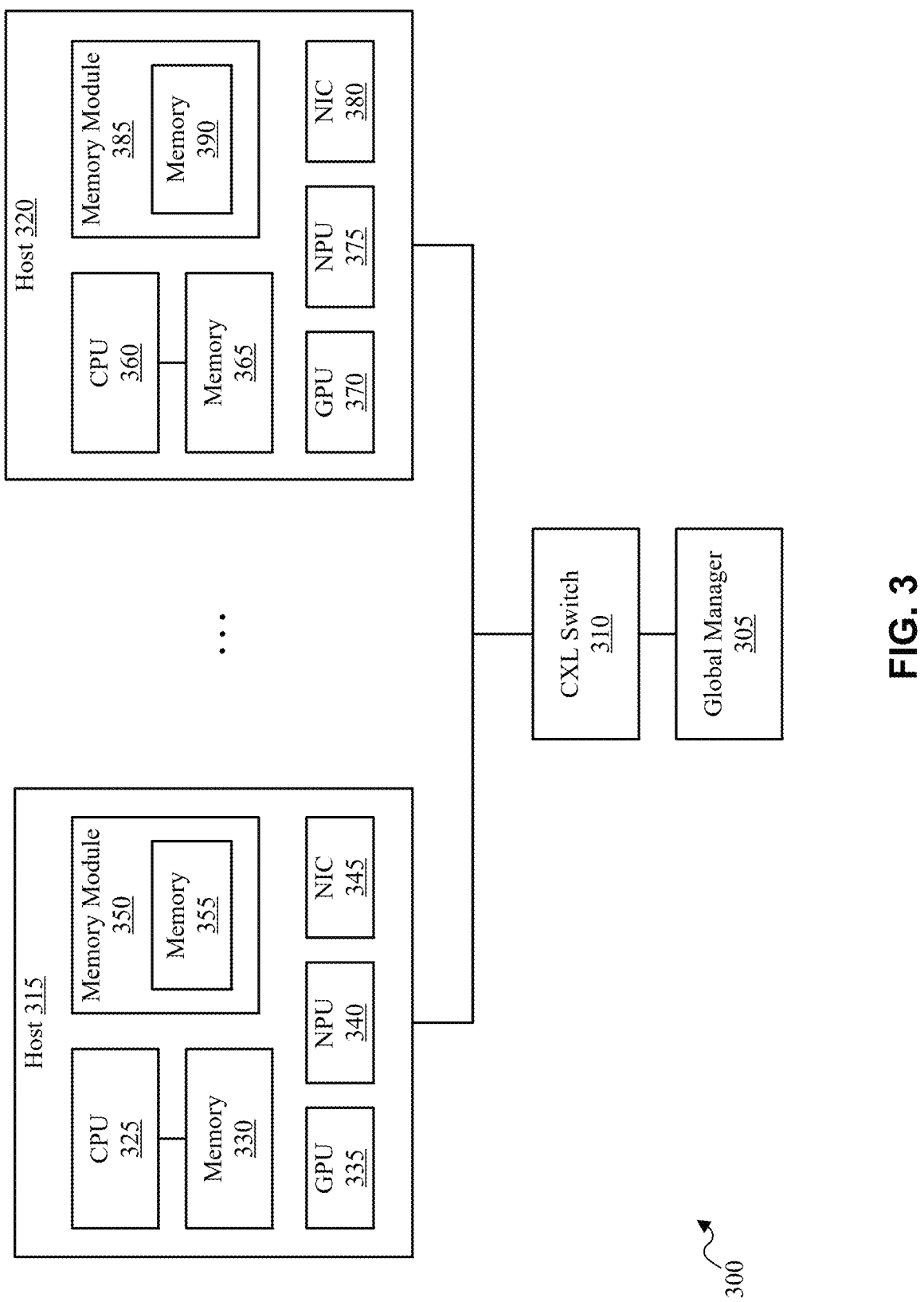
FIG. 3 illustrates an example system in accordance with one or more implementations as described herein.

FIG. 3 illustrates an example system 300 in accordance with one or more implementations as described herein. In some configurations, one or more aspects of system 300 may be implemented by or in conjunction with VPoM controller 140 of FIG. 1 and/or VPoM controller 230 of FIG. 2. In some configurations, one or more aspects of system 300 may be implemented by or in conjunction with machine 105, components of machine 105, or any combination thereof. System 300 may provide a high-performance computing environment and may be part of a data center. In some cases, system 300 may provide compute resources for artificial intelligence, machine learning, cloud computing, etc.

In the illustrated example, system 300 may include global manager 305, CXL switch 310, and one or more host machines (e.g., host 315, host 320, etc.). The one or more host machines may be examples of machine 105. In some cases, global manager 305 may be configured as a global manager over one or more virtual pools of memory (e.g., manager over at least one virtual pool of memory that includes memory pooled from multiple host machines). CXL switch 310 may enable multiple devices (e.g., host 315, host 320) to connect and communicate over the Compute Express Link (CXL) protocol. CXL switch 310 may be configured as a hub to manage data flow between various CPUs, accelerators, and memory devices of system 300, enabling virtual pooling of memory and high-speed data transfer across the network of connected components of system 300. CXL switch 310 may be based on the PCIe physical layer and may utilize a CXL cache-coherent protocol for efficient memory access across different devices of system 300.

As shown, host 315 may include one or more processors (e.g., CPU 325), memory 330 connected to CPU 325 (e.g., system memory, main memory, DRAM). In some cases, CPU 325 may initiate or generate a memory transaction request. In some cases, host 315 may include GPU 335 and/or NPU 340. As shown, host 315 may include network interface card (NIC) 345, which may be configured to enable host 315 to communicate with CXL switch 310, one or more hosts (e.g., host 320), and/or global manager 305. As shown, host 315 may include memory module 350, which may include at least one memory (e.g., memory 355). In some cases, memory of host 315 (e.g., memory 330 and/or memory 355) may be managed by memory module 350. In some cases, memory module 350 may manage one or more aspects of virtual pooling of memory. In some examples, memory module 350 may manage one or more aspects of scheduled prefetch mechanisms for virtual pools of memory. In some cases, memory module 350 may manage virtual pools of memory in conjunction with global manager 305.

As shown, host 320 may include one or more processors (e.g., CPU 360), memory 365 connected to CPU 360 (e.g., system memory, main memory, DRAM). In some cases, host 320 may include GPU 370 and/or NPU 375. As shown, host 320 may include NIC 380, which may be configured to enable host 320 to communicate with CXL switch 310, one or more hosts (e.g., host 315), and/or global manager 305. As shown, host 320 may include memory module 385, which may include at least one memory (e.g., memory 390). In some cases, memory of host 320 (e.g., memory 365 and/or memory 390) may be managed by memory module 385. In some cases, memory module 385 may manage one or more aspects of virtual pooling of memory. In some examples, memory module 385 may manage one or more aspects of scheduled prefetch mechanisms for virtual pools of memory. In some cases, memory module 385 may manage virtual pools of memory in conjunction with global manager 305. In one or more examples, CXL switch 310 may communicate with host 315 and/or components of host 315 via NIC 345. In some examples, CXL switch 310 may communicate with host 320 and/or components of host 320 via NIC 380. In some cases, host 315 and/or components of host 315 may communicate with host 320 and/or components of host 320 via NIC 345 and NIC 380. In some cases, communication between devices may include communication of data, control signals, etc.

The systems and methods described herein may be based on and/or may include virtual memory pools. For example, memory of host 315 and/or host 320 may be implemented in one or more virtual memory pools. A virtual memory pool can include mechanisms that manage memory allocation in a computing system (e.g., system 300). Virtual memory pools may be accessed at the operating system level and/or the application level. At the application level, a pool may be accessed through a networked file system or an API. At the operating system level, a page cache may use the pool as a large memory resource.

The systems and methods described herein may be based on and/or may include Compute Express Link (CXL) memory and/or CXL protocols. CXL memory can include memory (e.g., at least one of memory 330, memory 355, memory 365, or memory 390) with a high-speed interface (e.g., CXL switch 310) that allows for communication between devices such as processors, memory, accelerators, storage, and other IO devices (e.g., between hosts such as host 315 and host 320). CXL memory can be designed for high-performance data center computers and may use a Peripheral Component Interconnect Express (PCIe) physical and/or electrical interface. A CXL switch may enable memory pooling (e.g., where a fabric manager allocates memory devices to a host device). A CXL switch may enable a host to access multiple devices from a memory pool.

The systems and methods described herein may be based on and/or may include artificial intelligence (AI). AI can include creating intelligent machines that can sense, reason, act, and adapt. Machine learning (ML) may be a subset of AI that helps build AI-driven applications. The systems and methods described make be based on AI programs that use Large Language Models (LLMs). The systems and methods described herein may be based on and/or may include LLMs that use deep learning to analyze and generate content based on large amounts of data. The systems and methods described herein may be based on and/or may include one or more accelerators (e.g., NPU 340, NPU 375, etc.). Accelerators (e.g., AI accelerators) can include a specialized processor that executes machine learning algorithms. AI accelerators may include GPUs, TPUs, OPUs, IPUs, and the like. AI accelerators can improve the inference performance of neural networks.

Figure 4:
FIG. 4 illustrates an example system in accordance with one or more implementations as described herein.

FIG. 4 illustrates an example system 400 in accordance with one or more implementations as described herein. In some configurations, one or more aspects of system 400 may be implemented by or in conjunction with VPOM controller 140 of FIG. 1 and/or VPoM controller 230 of FIG. 2. In some configurations, one or more aspects of system 400 may be implemented by or in conjunction with machine 105, components of machine 105, or any combination thereof.

In the illustrated example, system 400 may include memory module 405 (e.g., CXL memory module). In some cases, memory module 405 may be a memory module of a host machine (e.g., machine 105, host 315, host 320). Memory module 405 may be an example of memory module 350 and/or memory module 385 of FIG. 3. As shown, memory module 405 may include local memory 410, virtual pool of memory (VPoM) local manager, virtual pool access gateway (VPAG) 420, coherence manager 425, stream processor 430, address map table 435, one or more CXL ports (e.g., CXL port 440, CXL port 445, etc.), and one or more out of band (OOB) channels (e.g., OOB channel 450).

In some examples, coherence manager 425 (e.g., VPOM coherence manager) may be configured to manage data coherence between hosts, applications, etc. In some cases, stream processor 430 may be configured to process one or more data streams from memory module 405 to one or more other devices (e.g., a host of memory module 405, a host of another memory module, an application, a remote device, etc.) and/or from the one or more other devices to memory module 405. For example, stream processor 430 may handle one or more data streams associated with data of virtual pools of memory. In some examples, address map table 435 (e.g., VPOM address map table) may be configured to manage an address mapping table that maps virtual pools of memory associated with memory module 405, a host of memory module 405, applications that use the virtual pool of memory, other devices, etc. For example, address map table 435 may manage address translations between virtual memory of a virtual pool of memory and the address of the physical memory where the data is physically stored.

As shown, local manager 415 (e.g., VPOM local manager) may include Donated Memory Region (DMR)

resource manager 455, DMR training agent 460 (e.g., DMR performance attribute training agent), and caching agent 465 (e.g., VPoM instance information caching agent). In some cases, local manager 415 may be configured to manage local aspects regarding a virtual pool of memory (e.g., local to memory module 405, local to a host machine of memory module 405, etc.). In some examples, DMR resource manager 455 may be configured to manage one or more DMR resources and/or resources associated with virtual pools of memory. In some cases, DMR training agent 460 may be configured to manage one or more DMR performances attributes. For example, DMR training agent 460 may learn, implement, and/or adjust one or more DMR performance attributes (e.g., performance attributes associated with virtual pools of memory). In some examples, caching agent 465 may cache data, metadata, and/or configurations associated with virtual pools of memory. In some cases, caching agent 465 may may configure the sharing of memory and cache resources based on the systems and methods described herein. In some cases, the scheduled prefetching described herein may include a prefetching configuration to predict what data to prefetch into memory (e.g., into faster memory), which allows for higher-performance. Prefetching can include predicting data most likely to be called by a processor, retrieving the data, and storing the prefetched data in a buffer memory (e.g., cache) before the processor calls for the data. In some cases, caching agent 465 may perform one or more operations associated with prefetching data and storing the prefetched data in a memory (e.g., cache, buffer) before the processor calls for the data.

As shown, VPAG 420 may include local memory controller 470, prefetch manager 475, remote memory transaction controller (RMTC) 480, and packet dispatcher 485 (e.g., memory transaction packet dispatcher). In some examples, local memory controller 470 may control one or more aspects associated with memory of memory module 405 (e.g., local memory 410). In some cases, local memory controller 470 may control memory operations (e.g., read, write, allocate, deallocate) associated with local memory 410. In some cases, local memory controller 470 may control memory operations of virtual pools of memory (e.g., memory operations of virtual pools of memory associated with local memory 410). In some cases, prefetch manager 475 may perform one or more operations described herein. For example, prefetch manager 475 may perform one or more operations associated with virtual pools of memory and/or scheduled prefetch mechanisms for virtual pools of memory. In some cases, RMTC 480 may control remote memory transactions associated with virtual pools of memory and/or scheduled prefetch mechanisms for virtual pools of memory. For example, RMTC 480 may control memory operations (e.g., read, write, allocate, deallocate, etc., associated with remote devices using virtual pools of memory). For instance, RMTC 480 may control memory operations associated with remote devices using virtual pools of memory linked to memory module 405 (e.g., linked to memory of memory module 405). In some cases, packet dispatcher 485 may control communication of packets associated with virtual pools of memory and/or scheduled prefetch mechanisms for virtual pools of memory. In some cases, packet dispatcher 485 may route packets to local and/or remote entities (e.g., remote and/or local memory, hosts, applications, etc.).

In some cases, CXL port 440 and/or CXL port 445 may include, respectively, a physical interface that enables memory module 405 to connect to other devices (e.g., remote hosts, remote servers, remote applications). CXL port 440 and/or CXL port 445 may enable memory module 405 to connect with a CXL interconnect that provides a high-speed connection that allows to memory modules (e.g., memory module 405) and/or hosts (e.g., host 315, host 320) to share memory and cache resources. In some cases, OOB channel 450 may provide a separate, independent transmission channel that may be configured to communicate data outside of default or main data stream channels. In some examples, CXL port 440 and/or CXL port 445 may provide a default communication channel of memory module 405 and OOB channel 450 may provide a separate, independent transmission channel of memory module 405. In some cases, CXL port 440, CXL port 445, and/or OOB channel 450 may communicate data associated with virtual pools of memory and/or scheduled prefetch mechanisms for virtual pools of memory.

System 400 provide virtual pool of memory (VPoM) mechanisms that avoid or minimize the stranded memory problem, which can happen even when a host uses CXL Memory Module (CMM) to expand the memory capacity. Stranded memory is a problem that can occur when a server has memory that is available, but cannot be used because all of the server's cores are allocated (e.g., to virtual machines (VMs)). This can happen when the DRAM-to-core ratio of the VMs does not match the server's resources. Stranded memory issues increase power consumption and cooling resource usage, resulting in wasted energy and expenses, which leads to DRAM inefficiencies.

System 400 may be used in a large-scale high-performance computing system, such as inference/training systems for large language models, and/or high-performance computing systems. The systems and methods described provide a VPOM system architecture and VPOM operations to create and to use (e.g., read/write) VPOM instances, which may include methods to build address space, and methods to route memory transaction request packets. The systems and methods provide features that avoid or minimize performance bottlenecks of VPOM systems.

Based on the systems and methods described herein, system 400 can include a shared memory system virtually constructed with a set of donated memory regions from individual CXL Memory Modules (CMMs). System 400 provides a VPOM architecture that improves system performance, increases memory bandwidth, and lowers latency (e.g., compared to centralized and physical CXL memory pools). System 400 provides a coherence management scheme (e.g., via coherence manager 425) and VPoM performance enhancement features (e.g., prefetch processing, stream processing via stream processor 430) that minimize performance bottlenecks.

As shown, system 400 provides a stream processing architecture for VPOM systems via stream processor 430 (e.g., VPOM stream processor). Stream processing via stream processor 430 may minimize the performance bottlenecks (e.g., of an aggregation node), and reduce traffic overhead (e.g., in the interconnect network of VPOM systems). In some cases, stream processor 430 may be configured to find a maximum value or minimum value, to calculate average value, to select data which satisfy the arithmetic condition ($==, >=, <=, >, <$), to transform a data format, to encrypt/decrypt data, to calculate the data integrity checksum, etc. The stream processing provided by stream processor 430 improves AI and high-performance computing operations.

FIG. 5 illustrates an example packet 500 in accordance with one or more implementations as described herein. In some configurations, one or more aspects of packet 500 may be implemented by or in conjunction with VPoM controller 140 of FIG. 1 and/or VPOM controller 230 of FIG. 2. In some configurations, one or more aspects of packet 500 may be implemented by or in conjunction with machine 105, components of machine 105, or any combination thereof. In some cases, packet 500 may include a CXL memory transaction packet.

In the illustrated example, packet 500 may include one or more fields. In some cases, packet 500 may depict VPoM prefetch-related fields of a memory transaction request packet (e.g., a remote memory transaction request packet). As shown, packet 500 may include at least one of header 505, prefetch flag 510, Before-This-Time field 515, After-This-Transaction field 520, data store location field 525, or notification channel field 530. The order of the fields may be in the order shown or in any other possible order. Table 1 provides further details regarding the fields of packet 500.

TABLE 1

| FIELD NAME | FIELD VALUE TYPE |
|---|---|
| Prefetch-Flag | No prefetch (e.g., prefetch disabled) when this field value is a first logical value (e.g., 0b or 1b). |
| | If this field value is a second logical value (e.g., 1b if first logical value is 0b, or 0b if first logical field is 1b), then indicates prefetch is requested (explicit intention to prefetch). |
| | If field is empty (e.g., no value indicated), then may be treated as prefetch disabled. |
| Before-This-Time | If most significant bit (msb) of this field value is a first logical value (e.g., 0b or 1b), then the remaining value of this field indicates a relative time from this request. |
| | If msb of this field value is a second logical value (e.g., 1b if first logical value is 0b, or 0b if first logical field is 1b), then the remaining value of this field means absolute time (UTC). |
| After-This-Transaction | If msb of this field value is a first logical value (e.g., 0b or 1b), prefetch manager 475 may perform operations in any order (e.g., irrespective of execution order, performing the VPoM memory transaction without regard to the execution order of related tasks, operations, etc.). The remaining value of this field may be ignored. |
| | If msb of this field value is a second logical value (e.g., 1b if first logical value is 0b, or 0b if first logical field is 1b), prefetch manager 475 may ensure that the related prefetch operation is performed after a specified transaction (e.g., specified VPoM memory transaction). The remaining value of this field may be used to specify the VPoM memory transaction ID. In some examples, the transaction ID may be returned when an API is called for a VPoM memory read or write transaction. |

TABLE 1-continued

| FIELD NAME | FIELD VALUE TYPE |
| --- | --- |
| | Then the After-This-Transaction field may be filled with this transaction ID (e.g., by a user, by VPAG 420, etc.) based on a VPoM memory read (prefetch) transaction with After-This-Transaction enabled. |
| Data-Store-Location | If msb of this field value is a first logical value (e.g., 0b or 1b), then VPAG 420 may place the prefetched data on to a local memory (e.g., local memory (e.g., memory 355, local memory 410, CMM-VPoM memory). The remaining value of this field may indicate the starting address of the prefetched data in the local memory (e.g., CMM-VPoM memory). In some cases, CMM-VPoM memory may include virtual memory (e.g., software-based virtual version of memory). If msb of this field value is a second logical value (e.g., 1b if first logical value is 0b, or 0b if first logical field is 1b), then VPAG 420 may place the prefetched data on to the host local memory. The remaining value of this field may indicate the starting address of the prefetched data in the host local memory (e.g., CPU memory, memory 330). |
| Prefetch-Done-Notification-Channel | The msb 2-bits of this field may denote a notification method type. If msb 2-bits of this field are 00b, then there may be no prefetch-complete notification to the requester (e.g., source of the memory transaction request); the remaining value of this field may be ignored. Field may indicate an identifier (e.g., source address) of the requester. If msb 2-bits of this field has other values, then it may denote that the requester wants to be notified when the prefetch action is completed (e.g., based on any value other than 00b). The remaining value of this field may be used as a specification of notification channel preferred. 00b: no notification (e.g., no notification requested for when the prefetch is completed) 01b: provide notification; may indicate notification via message signaled interrupt (MSI); 10b: provide notification; may indicate notification via MSI-X (e.g., notification based on writing data to a system-specified address). 11b: Other custom notification method/channel May indicate channel information; the remaining value of this field may denote a notification channel ID to be used for this request. |

Accordingly, VPAG 420 may be configured to prefetch data when prefetch flag 510 is enabled in a memory transaction request. For example, when '1b' is the value of the prefetch field in a memory transaction request (e.g., prefetch enabled), VPAG 420 may check additional prefetch related fields for processing the request, such as Before-This-Time field 515, After-This-Transaction field 520, data store location field 525, and/or notification channel field 530.

In some example, VPAG 420 may calculate (e.g., estimate) the time to actually prefetch the data considering the amount of data to read and the target Donated Memory Region's (DMR's) latency and bandwidth information. The prefetch time should be determined to occur sufficiently before the time specified in the Before-This-Time field 515. For example, if the amount of data to read is 100 GB, and target DMR's maximum bandwidth is 10 GB/s, then VPAG 420 may determine that it will likely take at least 10 seconds to complete the prefetch operation. Accordingly, the prefetch operation may be scheduled so that it is completed at least 10 seconds before the time specified in the Before-This-Time field 515. In some cases, VPAG 420 may consider and/or compensate for the performance degradation effect caused by concurrent memory read and/or write transactions. For example, if there will be one or more additional 100 GB prefetch operations scheduled from the same DMR at the same time, then VPAG 420 may schedule the prefetch operation at least 20 seconds before the specified time in the Before-This-Time field 515.

VPAG 420 may provide ways to trigger data prefetch after (e.g., only after) one or more specified memory transactions are completed. This feature may be useful when there is a need to read (prefetch) the data at specified memory location, after (e.g., only after) some operation is completed (e.g., some data is scheduled to be written to that memory area, and the user wants to read (prefetch) that data). The After-This-Transaction field 520 may be used to control this feature, ensuring that a prefetch request is not initiated until the specified transaction is completed.

To support the Before-This-Time and After-This-Transaction features, prefetch manager 475 may include a timer (e.g., timer 155) and a transaction completion monitor. When both Before-This-Time and After-This-Transaction conditions are set in a VPOM memory transaction request, then prefetch manager 475 may schedule the prefetch action so that both of the conditions are satisfied. For example, prefetch manager 475 may schedule the prefetch action at a time and in a respective place so that the prefetch action is completed before the indicated time and initiated after the indicated transaction is executed. If it is determined that both of the conditions cannot be met, then prefetch manager 475 may raise an error exception for the requester to handle.

VPAG 420 may provide data prefetch notification service to a host CPU (e.g., CPU 325 and/or other devices in the host). When a host CPU generates a memory transaction request packet (e.g., packet 500), the host CPU may set prefetch flag 510, specify an expected time in the Before-This-Time field 515, specify a transaction (e.g., prerequisite transaction) in After-This-Transaction field 520, specify a preferred location to store the prefetched data in data store location field 525, and/or specify an interrupt type and/or ID (e.g., notification channel ID) in notification channel field 530, etc. In some examples, at least one of these fields may be implemented in a reserved area of a CXL memory request packet (e.g., packet 500).

Accordingly, the systems and methods described herein define scheduled prefetch mechanisms for VPoM systems.

The systems and methods may include monitoring and triggering prefetch actions based on Before-This-Time/After-This-Transaction conditions. The systems and methods may include a device architecture that includes a remote data prefetch manager and a memory transaction controller.

Figure 6:
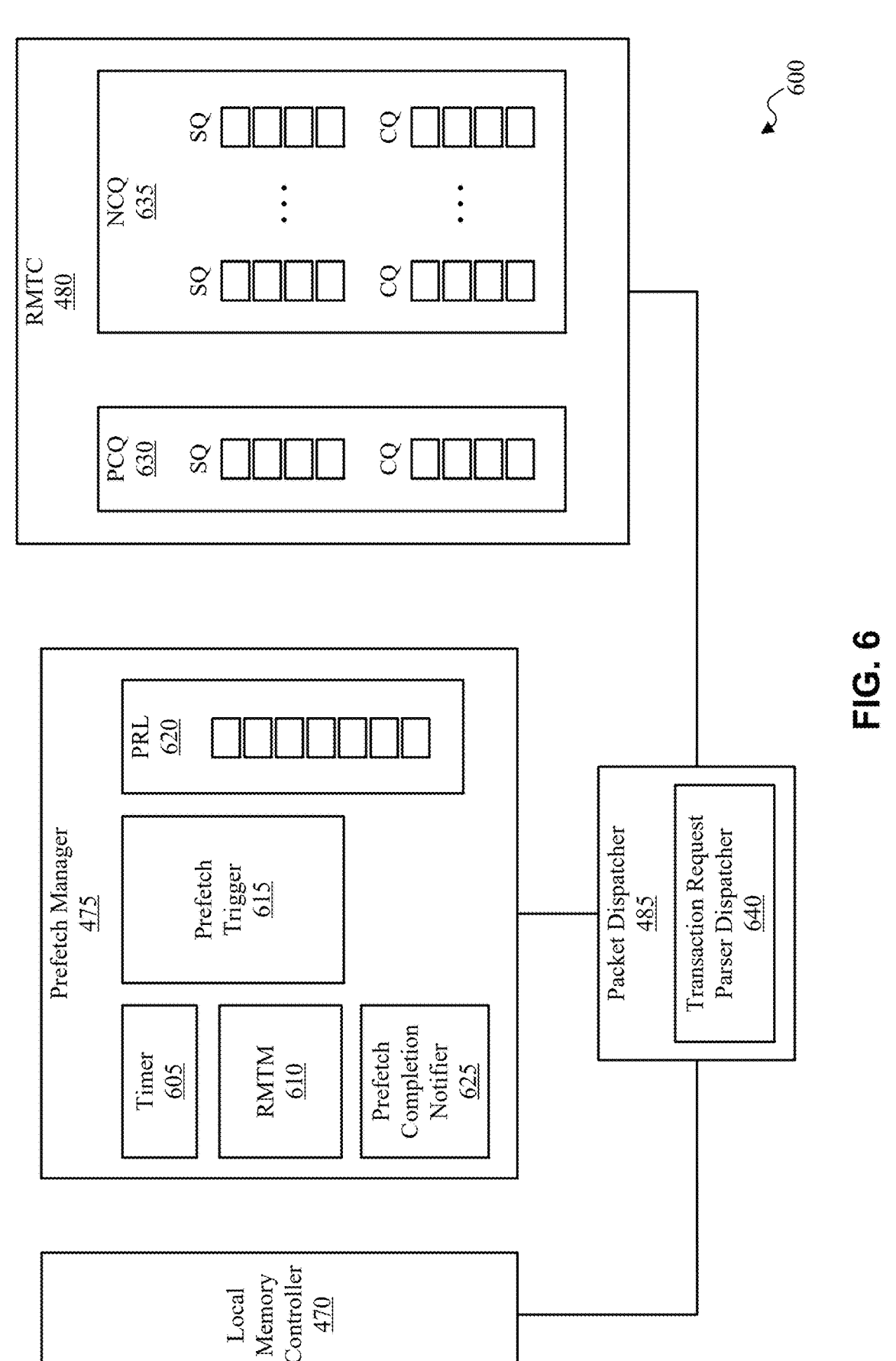
FIG. 6 illustrates an example system in accordance with one or more implementations as described herein.

FIG. 6 illustrates an example system 600 in accordance with one or more implementations as described herein. In some configurations, one or more aspects of system 600 may be implemented by or in conjunction with VPOM controller 140 of FIG. 1 and/or VPoM controller 230 of FIG. 2. In some configurations, one or more aspects of system 600 may be implemented by or in conjunction with machine 105, components of machine 105, or any combination thereof. System 600 may depict at least a portion of a virtual pool access gateway (e.g., VPAG 420).

In the illustrated example, system 600 may include local memory controller 470, prefetch manager 475, RMTC 480, and packet dispatcher 485. As shown, prefetch manager 475 may include timer 605, remote memory transaction monitor (RMTM) 610, prefetch trigger 615, prefetch request list (PRL) 620, and prefetch completion notifier 625. In some cases, timer 605 may time one or more prefetch operations (e.g., VPoM prefetch operations), indicate a time period, indicate a lapse of time, indicate an expiration, indicate a timeout, etc. Timer 605 may be used to indicate a prefetch before-this-time condition is met. RMTM 610 may be configured to monitor one or more aspects of remote memory transactions (e.g., transactions associated with scheduled prefetch for virtual pools of memory).

In some examples, prefetch trigger 615 may include logic (e.g., a logic gate) for receiving one or more inputs and generating an output based on the logic and the one or more inputs. Prefetch trigger 615 may be configured to generate a logical one for an output based on a first input being a logical one and a second input being a logical one (e.g., AND gate).

PRL 620 may include a storage component (e.g., buffer, circular buffer, buffer list, first in first out (FIFO), etc.). In some cases, PRL 620 may be configured to store data, metadata, information, etc., regarding scheduled prefetch for virtual pools of memory. As shown, PRL 620 may include a storage component with multiple entries (e.g., PRL slots, PRL positions, PRL entries, buffer list entries). In some cases, an entry of PRL 620 may store a memory transaction request (e.g., packet dispatcher 485 may add a memory transaction request to PRL 620). In some cases, an entry of PRL 620 may store information regarding a memory transaction request (e.g., data from fields of a memory transaction request, data from fields of a remote memory transaction request, etc.).

In some examples, prefetch completion notifier 625 may provide one or more notifications regarding prefetch operations described herein (e.g., scheduled prefetch for virtual pools of memory, indicate a prefetch operation is completed, etc.).

In the illustrated example, RMTC 480 may include prefetch command queue (PCQ) 630 and normal command queue (NCQ) 635. As shown, PCQ 630 may may include at least one submission queue (SQ) and at least one completion queue (CQ). Also, NCQ 635 may may include at least one submission queue (SQ) and at least one completion queue (CQ). In some cases, PCQ 630 and/or NCQ 635 may be configured to store data, metadata, information, etc., associated with scheduled prefetch for virtual pools of memory. In some cases, an SQ of PCQ 630 and/or NCQ 635 may include at least one submission queue entry associated with scheduled prefetch for virtual pools of memory. Similarly, a CQ of PCQ 630 and/or NCQ 635 may include at least one completion queue entry associated with scheduled prefetch for virtual pools of memory. For example, a command added to the CQ of PCQ 630 may be a submission queue entry (SQE) and a command that has been executed may be a completion queue entry (CQE).

In some cases, RMTC 480 may use an SQ of PCQ 630 for submitting prefetch commands based on the scheduled prefetch systems and methods described herein. In some examples, an SQ of PCQ 630 may include a circular buffer that holds prefetch commands to be executed. An SQ of NCQ 635 may include a circular buffer that holds normal commands (e.g., default commands, non-prefetch commands) to be executed.

Packet dispatcher 485, in conjunction with prefetch manager 475, may prepare prefetch commands. In some cases, transaction request parser dispatcher 640 may dispatch one or more prefetch requests (e.g., to prefetch manager 475). Transaction request parser dispatcher 640 may parse a remote memory transaction request to identify information (e.g., prefetch indicator, source identifier, destination identifier, a request priority indicator, type of application making request, etc.). RMTC 480 may pick up the SQ entries in order, but may execute them in any order. The CQ of PCQ 630 and/or NCQ 635 may include a circular buffer that holds the status of completed commands. RMTC 480 may append an entry to a CQ of PCQ 630 when RMTC 480 has finished processing a prefetch command. RMTC 480 may append an entry to a CQ of NCQ 635 when RMTC 480 has finished processing a normal command.

In some examples, transaction request parser dispatcher 640 may receive a memory transaction request (e.g., from a local host, a remote host, a local application, a remote application, etc.). In some cases, the memory transaction request may include a remote memory transaction request. Transaction request parser dispatcher 640 may parse memory transaction requests and/or remote memory transaction requests to determine information indicated in the request. For example, transaction request parser dispatcher 640 may parse a remote memory transaction request to determine that the request includes an enabled prefetch flag.

Figure 7:
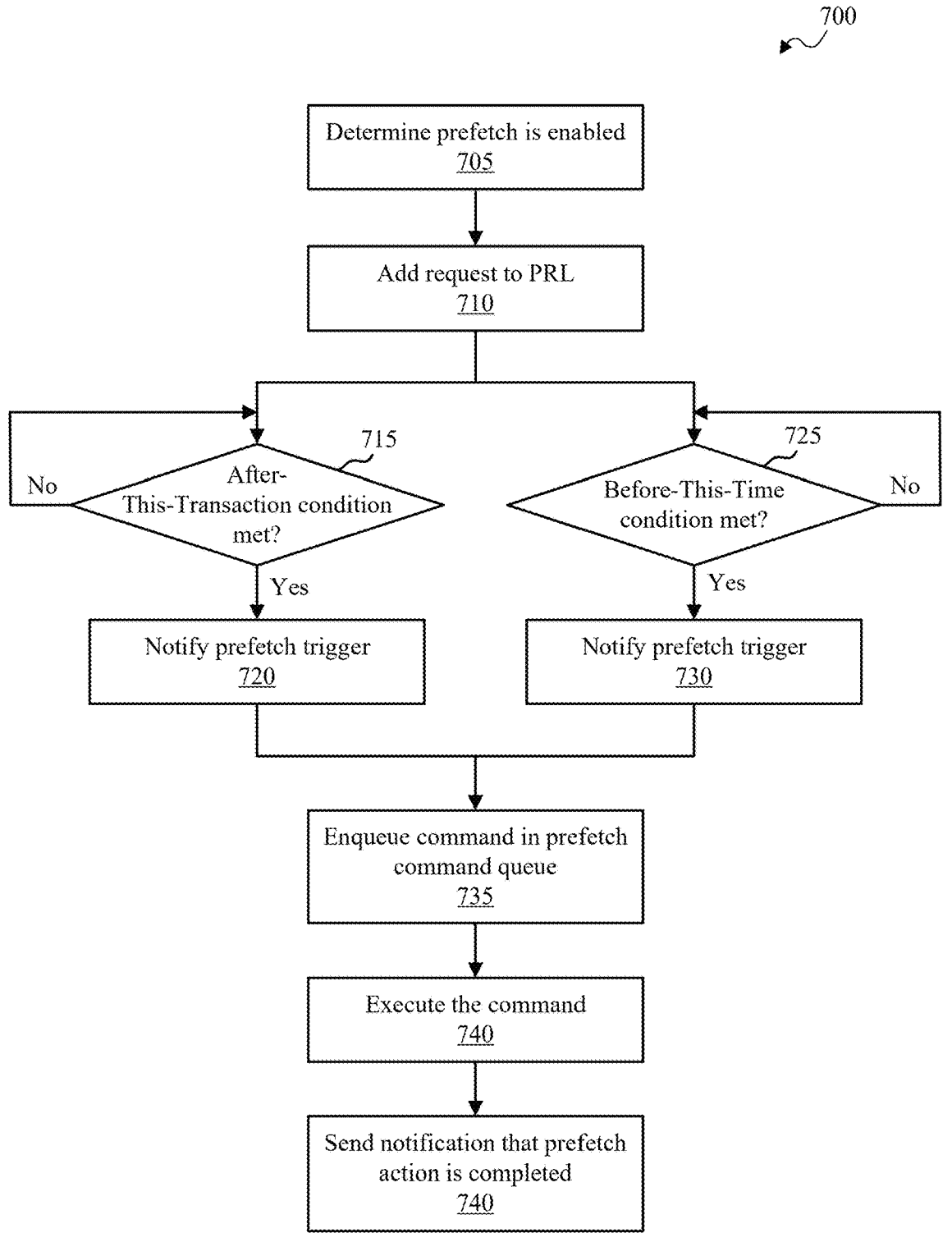
FIG. 7 depicts a flow diagram illustrating an example method associated with the disclosed systems, in accordance with example implementations described herein.

FIG. 7 depicts a flow diagram illustrating an example method 700 associated with the disclosed systems, in accordance with example implementations described herein. In some configurations, one or more aspects of method 700 may be implemented by or in conjunction with VPoM controller 140 of FIG. 1 and/or VPoM controller 230 of FIG. 2. In some configurations, one or more aspects of method 700 may be implemented by or in conjunction with machine 105, components of machine 105, or any combination thereof. The depicted method 700 is just one implementation and one or more operations of method 700 may be rearranged, reordered, omitted, and/or otherwise modified such that other implementations are possible and contemplated.

At 705, method 700 may include determining prefetch is enabled. For example, a device or a component of a device (e.g., packet dispatcher 485, transaction request parser dispatcher 640) may receive a memory transaction request and analyze the request. For example, transaction request parser dispatcher 640 may parse the memory transaction request and determine where to dispatch the request based on the information from parsing the request. In some cases, transaction request parser dispatcher 640 may identify a prefetch field of the memory transaction request and determine whether a prefetch option is enabled. In some cases, transaction request parser dispatcher 640 may determine that the prefetch option is enabled and that the memory transaction request is a remote memory transaction request.

When method 700 determines that the prefetch option is disabled, then packet dispatcher 485 may be configured to enqueue a command to a normal command queue (e.g., NCQ 635) of a remote memory transaction controller (e.g., RMTC 480). When method 700 determines that the prefetch option is neither enabled nor disabled, then method 700 may determine whether the memory transaction request is a local transaction request. When method 700 determines that the memory transaction request is a local transaction request, then transaction request parser dispatcher 640 may enqueue a command and send the command to a local memory controller (e.g., local memory controller 470). In some cases, the local memory controller may process the command based on a local memory (e.g., local memory 410). When method 700 determines that the memory transaction request is not a remote memory transaction request and not a local memory transaction request (e.g., and neither indicates prefetch is enabled nor indicates prefetch is disabled), then exception handling may be invoked (e.g., indicates error condition). For example, transaction request parser dispatcher 640 may invoke exception handling based on the error condition.

At 710, method 700 may include adding a request to a prefetch request list (PRL). For example, when method 700 determines that the prefetch option is enabled, a memory transaction packet dispatcher (e.g., packet dispatcher 485) may add the memory transaction request to PRL 620. In some cases, packet dispatcher 485 may add the memory transaction request to PRL 620 based on transaction request parser dispatcher 640 determining that the prefetch option is enabled and that the memory transaction request is a remote memory transaction request (e.g., a non-local request). In some cases, the memory transaction request may include a remote memory transaction request (e.g., a request from a remote device, remote application, remote server, etc., that is received by a local machine such as machine 105; a machine of memory module 405).

In some examples, the memory transaction request may include After-This-Transaction information and/or Before-This-Time information. For example, when the prefetch option of the memory transaction request is enabled, the memory transaction request may include After-This-Transaction information that specifies a transaction that precedes the prefetch operation (e.g., prefetch operation may proceed upon confirming the specified transaction has been performed). Additionally, or alternatively, when the prefetch option of the memory transaction request is enabled, the memory transaction request may include Before-This-Time information that specifies a time by which the prefetch operation is to be performed (e.g., prefetch operation may proceed when it is performed before the specified time).

At 715, method 700 may include determining whether an After-This-Transaction condition is met. For example, a remote memory transaction monitor (e.g., RMTM 610) may check the status of a normal command queue (e.g., NCQ 635) and/or a prefetch command queue (e.g., PCQ 630) in RMTC 480 to meet the condition specified in the After-This-Transaction information stored in the Prefetch Request List (PRL). When method 700 determines that the After-This-Transaction condition is not satisfied, then, as shown, method 700 may return to check again whether the After-This-Transaction condition is satisfied (e.g., continue checking until After-This-Transaction condition is satisfied)

At 720, method 700 may include notifying a prefetch trigger. For example, when method 700 determines that the After-This-Transaction condition is satisfied, then a remote memory transaction monitor (e.g., RMTM 610) may notify a prefetch trigger (e.g., prefetch trigger 615) that the After-This-Transaction condition is satisfied.

At 725, method 700 may include determining whether a Before-This-Time condition is met. For example, a timer (e.g., timer 605, timer 155) may check the time to process the prefetch action based on the Before-This-Time information stored in PRL 620 to determine whether the Before-This-Time condition may be satisfied. When method 700 determines that the Before-This-Time condition is not satisfied (e.g., not going to be satisfied), then method 700 may return to check again whether the Before-This-Time condition is satisfied (e.g., continue checking until Before-This-Time condition is satisfied). When method 700 determines that the Before-This-Time condition cannot be met, then method 700 may trigger an error exception for the requester to handle.

At 730, method 700 may include notifying the prefetch trigger. For example, when method 700 determines that the Before-This-Time condition is satisfied, then a timer (e.g., timer 605, timer 155) may notify prefetch trigger 615 that the Before-This-Time condition is satisfied. In some cases, method 700 may include sending a first notification regarding the After-This-Transaction condition being satisfied and sending a second notification regarding the Before-This-Time condition being satisfied. In some examples, method 700 may include sending a notification (e.g., a single notification) that indicates the After-This-Transaction condition is satisfied and that the Before-This-Time condition is satisfied.

At 735, method 700 may include enqueuing a command in a prefetch command queue. For example, when prefetch trigger 615 determines that the After-This-Transaction condition and the Before-This-Time condition are satisfied, prefetch trigger 615 may trigger enqueuing a prefetch request in a prefetch command queue (e.g., PCQ 630). In some examples, PRL 620 may create a command for the selected prefetch request, and may enqueue the command to PCQ 630 in RMTC 480 (e.g., enqueue the command in a submission queue (SQ) of PCQ 630). In some cases, prefetch trigger 615 may determine multiple prefetch requests to be enqueued to PCQ 630. In some cases, prefetch trigger 615 may select a subset of prefetch requests from a pool of prefetch requests. Prefetch trigger 615 may arrange and/or sort the selected prefetch requests in an order that ensures that each selected prefetch request satisfies a respective Before-This-Time condition and After-This-Transaction condition. In some cases, PRL 620 may generate a prefetch command for each prefetch request selected to be enqueued in PCQ 630 (e.g., based on the arranged order determined by prefetch trigger 615).

At 740, method 700 may include executing the command. For example, RMTC 480 may identify the command for the selected prefetch request in PCQ 630 and may execute the command. In some examples, RMTC 480 may execute the command that is in a submission queue (SQ) of PCQ 630. In some cases, RMTC 480 may update a completion queue (CQ) of PCQ 630 based on the command being executed (e.g., indicate the prefetch action is completed).

At 745, method 700 may include sending a notification that the prefetch action is completed. For example, when a prefetch action is completed, a prefetch complete notifier (e.g., prefetch completion notifier 625) may send a notification to the requester (e.g., remote source of the remote memory transaction request), where the notification indicates that the prefetch action is completed.

Accordingly, the systems and methods described herein include logic to provide scheduled prefetch mechanisms for virtual pools of memory. The logic includes any combination of hardware (e.g., at least one memory, at least one processor, etc.), logical circuitry, firmware, and/or software to provide systems and methods of scheduled prefetch mechanisms for virtual pools of memory.

Figure 8:
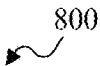
FIG. 8 depicts a flow diagram illustrating an example method associated with the disclosed systems, in accordance with example implementations described herein.
Figure 8:
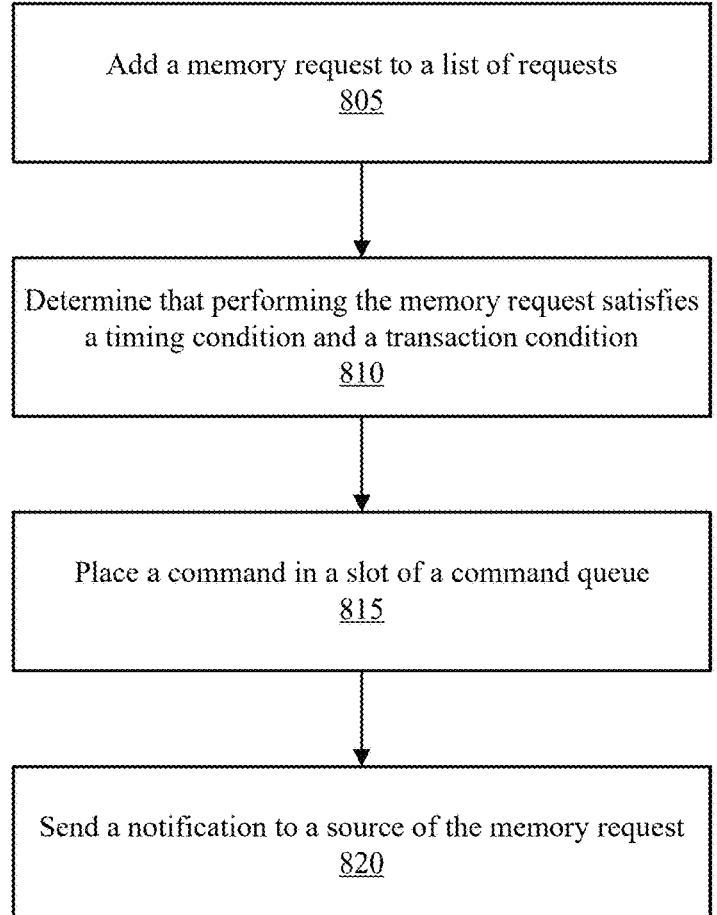

FIG. 8 depicts a flow diagram illustrating an example method 800 associated with the disclosed systems, in accordance with example implementations described herein. In some configurations, one or more aspects of method 800 may be implemented by or in conjunction with VPoM controller 140 of FIG. 1 and/or VPoM controller 230 of FIG. 2. In some configurations, one or more aspects of method 800 may be implemented by or in conjunction with machine 105, components of machine 105, or any combination thereof. The depicted method 800 is just one implementation and one or more operations of method 800 may be rearranged, reordered, omitted, and/or otherwise modified such that other implementations are possible and contemplated.

At 805, method 800 may include adding a memory request to a list of requests. For example, packet dispatcher 485 may add a memory request to a list of requests based on a determination that a prefetch option in the memory request is enabled.

At 810, method 800 may include determining that performing the memory request satisfies a timing condition and a transaction condition. For example, packet dispatcher 485 may determine that performing the memory request satisfies a timing condition and a transaction condition indicated in the memory request.

At 815, method 800 may include placing a command in a slot or position of a command queue. For example, prefetch trigger 615 may place, in a slot or position of a command queue, a command that is generated based on the determination that performing the memory request satisfies the timing condition and the transaction condition.

At 820, method 800 may include sending a notification to a source of the memory request. For example, RMTC 480 may send a notification to a source of the memory request based on RMTC 480 determining that the command is executed.

Figure 9:
FIG. 9 depicts a flow diagram illustrating an example method associated with the disclosed systems, in accordance with example implementations described herein.
Figure 9:
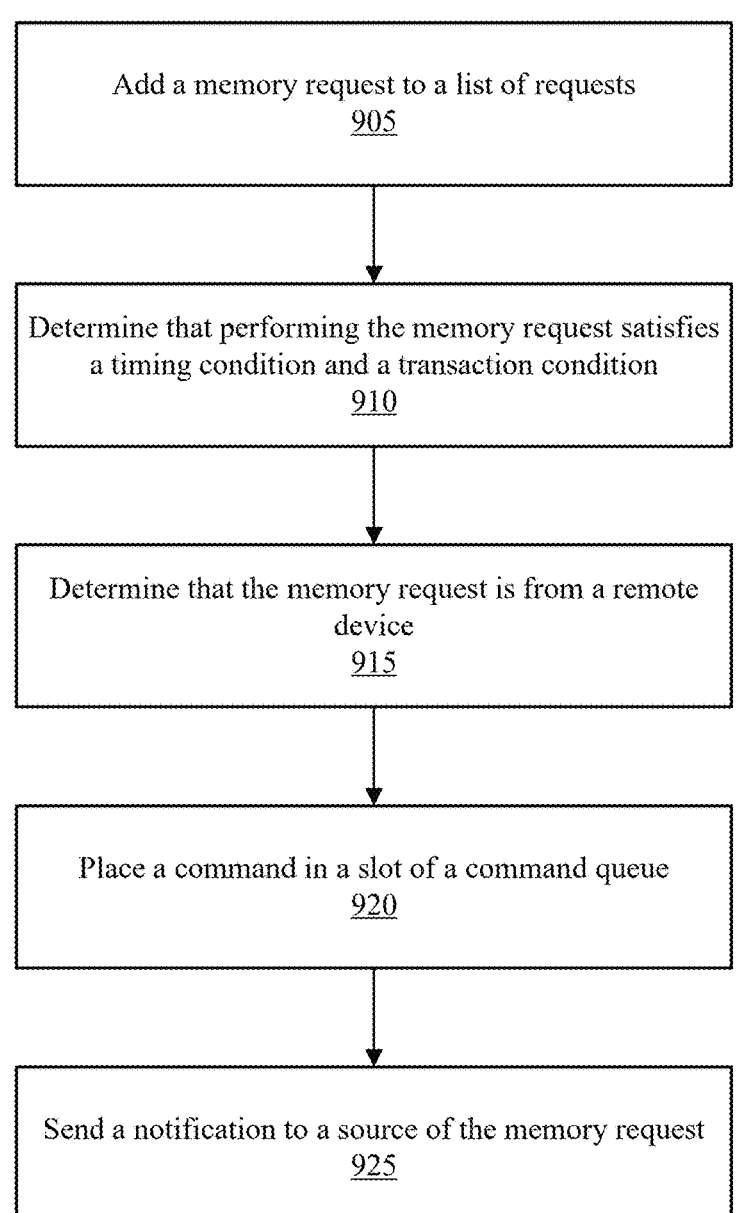

FIG. 9 depicts a flow diagram illustrating an example method 900 associated with the disclosed systems, in accordance with example implementations described herein. In some configurations, one or more aspects of method 900 may be implemented by or in conjunction with VPoM controller 140 of FIG. 1 and/or VPoM controller 230 of FIG. 2. In some configurations, one or more aspects of method 900 may be implemented by or in conjunction with machine 105, components of machine 105, or any combination thereof. The depicted method 900 is just one implementation and one or more operations of method 900 may be rearranged, reordered, omitted, and/or otherwise modified such that other implementations are possible and contemplated.

At 905, method 900 may include adding a memory request to a list of requests. For example, packet dispatcher 485 may add a memory request to a list of requests based on a determination that a prefetch option in the memory request is enabled.

At 910, method 900 may include determining that performing the memory request satisfies a timing condition and a transaction condition. For example, packet dispatcher 485 may determine that performing the memory request satisfies a timing condition and a transaction condition indicated in the memory request.

At 915, method 900 may include determining that the memory request is from a remote device. For example, packet dispatcher 485 may determine that a source of the memory request is remote from a host that is processing the memory request (e.g., a host that includes packet dispatcher 485).

At 920, method 900 may include placing a command in a slot or position of a command queue. For example, prefetch trigger 615 may place, in a slot or position of a command queue, a command that is generated based on the determination that (a) the memory request is from a remote device; and (b) performing the memory request satisfies the timing condition and the transaction condition.

At 925, method 900 may include sending a notification to a source of the memory request. For example, RMTC 480 may send a notification to a source of the memory request based on RMTC 480 determining that the command is executed.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wired and/or wireless communication device such as a switch, router, network interface controller, cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be wireless, wired, mobile, and/or stationary.

As used within this document, the term "communicate" is intended to include transmitting, or receiving, or both transmitting and receiving. Similarly, the bidirectional exchange of data between two devices (both devices transmit and receive during the exchange) may be described as 'communicating', when only the functionality of one of those devices is being claimed. The term "communicating" as used herein with respect to wired and/or wireless communication signals includes transmitting the wired and/or wireless communication signals and/or receiving the wired and/or or wireless communication signals. For example, a communication unit, which is capable of communicating wired and/or wireless communication signals, may include a wired/wireless transmitter to transmit communication signals to at least one other communication unit, and/or a wired/wireless communication receiver to receive the communication signal from at least one other communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples as set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of managing a memory pool, the method comprising:

adding a memory request to a list of requests based on a determination that a prefetch option in the memory request is enabled;

determining that performing the memory request satisfies a timing condition and a transaction condition indicated in the memory request;

placing, in a position of a command queue, a command that is generated based on the determination that performing the memory request satisfies the timing condition and the transaction condition; and sending a notification to a source of the memory request based on a determination that the command is executed.

2. The method of claim 1, wherein the position is selected to schedule execution of the command based on the determination that performing the memory request satisfies the timing condition and the transaction condition indicated in the memory request.

3. The method of claim 1, wherein satisfying the timing condition is based on a determination that the memory request is performed before a time indicated in the memory request.

4. The method of claim 1, wherein satisfying the transaction condition is based on a determination that the memory request is performed after execution of a transaction indicated in the memory request.

5. The method of claim 1, wherein a location of the position is selected based on a position of a second position of the command queue that holds the transaction indicated in the memory request.

6. The method of claim 1, wherein a prefetch manager generates the command and adds the command to the command queue based on sending a message to the prefetch manager indicating that the timing condition and the transaction condition are satisfied.

7. The method of claim 1, wherein the command is added to the command queue based on a determination that the source is remote from a host that is processing the memory request.

8. The method of claim 7, wherein:

the memory pool comprises a memory space provided by a first memory module of the host and at least a second memory module of a second host, and the second host is connected to the host via a switch configured to operate with a cache coherent protocol.

9. The method of claim 1, wherein the list of requests is configured to store memory requests from remote devices that have the prefetch option enabled.

10. A device for managing a memory pool, the device comprising:

one or more processors; and memory storing instructions that, when executed by the one or more processors, cause the device to:

add a memory request to a list of requests based on a determination that a prefetch option in the memory request is enabled;

determine that performing the memory request satisfies a timing condition and a transaction condition indicated in the memory request;

place, in a position of a command queue, a command that is generated based on the determination that performing the memory request satisfies the timing condition and the transaction condition; and send a notification to a source of the memory request based on a determination that the command is executed.

11. The device of claim 10, wherein the position is selected to schedule execution of the command based on the determination that performing the memory request satisfies the timing condition and the transaction condition indicated in the memory request.

12. The device of claim 10, wherein satisfying the timing condition is based on a determination that the memory request is performed before a time indicated in the memory request.

13. The device of claim 10, wherein satisfying the transaction condition is based on a determination that the memory request is performed after execution of a transaction indicated in the memory request.

14. The device of claim 10, wherein a location of the position is selected based on a position of a second position of the command queue that holds the transaction indicated in the memory request.

15. The device of claim 10, wherein a prefetch manager generates the command and adds the command to the command queue based on sending a message to the prefetch manager indicating that the timing condition and the transaction condition are satisfied.

16. The device of claim 10, wherein the command is added to the command queue based on a determination that the source is remote from a host that is processing the memory request.

17. The device of claim 16, wherein:

the memory pool comprises a memory space provided by a first memory module of the host and at least a second memory module of a second host, and the second host is connected to the host via a switch configured to operate with a cache coherent protocol.

18. A non-transitory computer-readable medium storing code that comprises instructions executable by a processor to:

add a memory request to a list of requests based on a determination that a prefetch option in the memory request is enabled;

determine that performing the memory request satisfies a timing condition and a transaction condition indicated in the memory request;

place, in a position of a command queue, a command that is generated based on the determination that performing the memory request satisfies the timing condition and the transaction condition; and send a notification to a source of the memory request based on a determination that the command is executed.

19. The non-transitory computer-readable medium of claim 18, wherein the position is selected to schedule execution of the command based on the determination that performing the memory request satisfies the timing condition and the transaction condition indicated in the memory request.

20. The non-transitory computer-readable medium of claim 18, wherein satisfying the timing condition is based on a determination that the memory request is performed before a time indicated in the memory request.

* * * * *